United States Patent [19]
Hoover

[11] Patent Number: 5,173,930
[45] Date of Patent: Dec. 22, 1992

[54] X-RAY MONOCHROMATOR

[75] Inventor: Richard B. Hoover, Huntsville, Ala.

[73] Assignee: The United States of America as represented by the Administrator of the National Aeronautics and Space Administration, Washington, D.C.

[21] Appl. No.: 803,268

[22] Filed: Nov. 22, 1991

[51] Int. Cl.$^5$ .............................................. G21K 1/06
[52] U.S. Cl. ...................................... 378/85; 378/145
[58] Field of Search .................. 378/82, 84, 85, 145

[56] References Cited

U.S. PATENT DOCUMENTS 4,567,605 1/1986 Bartels ................................... 378/85
4,958,363 9/1990 Nelson et al. .......................... 378/85

Primary Examiner—Craig E. Church
Attorney, Agent, or Firm—Robert L. Broad, Jr.; John R. Manning; Guy M. Miller

[57] ABSTRACT

An x-ray monochromator, wherein a housing supports a plurality of mirrors forming a plurality of opposed mirror faces in parallel with each other and having thereon multilayer coatings, with each of said pairs of mirror faces being provided with identical coatings which are different from the coatings on the other pairs of mirror faces such that each pair of mirror faces has a peak x-ray reflection at a different wavelength regime. The housing is moveable to bring into a polychromatic x-ray beam that pair of mirror faces having the best x-ray reflection for the desired wavelength, with the mirrors being pivotable to move the mirror faces to that angle of incidence at which the peak reflectivity of the desired wavelength x-rays occurs.

5 Claims, 2 Drawing Sheets

X-RAY MONOCHROMATOR

ORIGIN OF THE INVENTION

The invention described herein was made by an employee of the United States Government and may be manufactured and used by or for the Government of the United States of America without the payment of any royalties thereon or therefor.

BACKGROUND OF THE INVENTION

1. Field of the Invention

This invention relates to monochromators.

2. Prior Art

Monochromators which can produce a monochromatic beam with narrow spectral wavebands are known. Such beams are very useful in the testing and calibrating of x-ray telescopes and microscopes, in research in biological and biomedical disciplines, in research in properties of materials and processing etc.

Previous monochromators have used metal foil filters, gratings, or crystals. Metal foil monochromators have the advantage of a high throughput but do not have the narrow bandwidth needed for some applications. Much higher spectral resolution is possible with the use of crystal or grating monochromators but these have other disadvantages.

Natural crystal monochromators are suitable for hard x-ray use and even some of the shorter wavelengths in the soft x-ray wavelengths but the crystal lattice structure in naturally occurring crystals is too small to permit observations in the longer wavelength soft x-ray/EUV regimes. Grating monochromators are capable of covering the soft x-ray/EUV portions of the electromagnetic spectrum, which is the concern of the present invention, but they have a very low throughput.

In addition, grating monochromators are difficult to fabricate, align and maintain in optical alignment. Also, grating monochromators are typically large and expensive.

SUMMARY OF THE INVENTION

An x-ray monochromator wherein a plurality of parallel pairs of facing mirrors are mounted in a housing having therein an inlet window and an outlet window for each pair of mirrors. Each pair of facing mirrors is coated with identical multilayer coatings which reflect x-rays at a wavelength which is dependent on the angle of incidence of the x-rays on the mirror and the nature of the multilayer coating, with different pairs of facing mirrors having different multilayer coatings such that each pair of facing mirrors has a peak reflection of x-rays at a different wavelength. The mirrors are pivotally mounted in a row in the housing and are interconnected so that all of the mirrors pivot at the same time and amount so that the mirror surfaces always remain parallel to each other. The housing is moveable so that any pair of mirrors can be moved into position to intercept a x-ray beam traveling along a fixed path through the inlet window associated with that pair of mirrors to thereby provide a monochromatic x-ray beam of a desired wavelength.

DETAILED DESCRIPTION OF THE INVENTION

Figure 1:
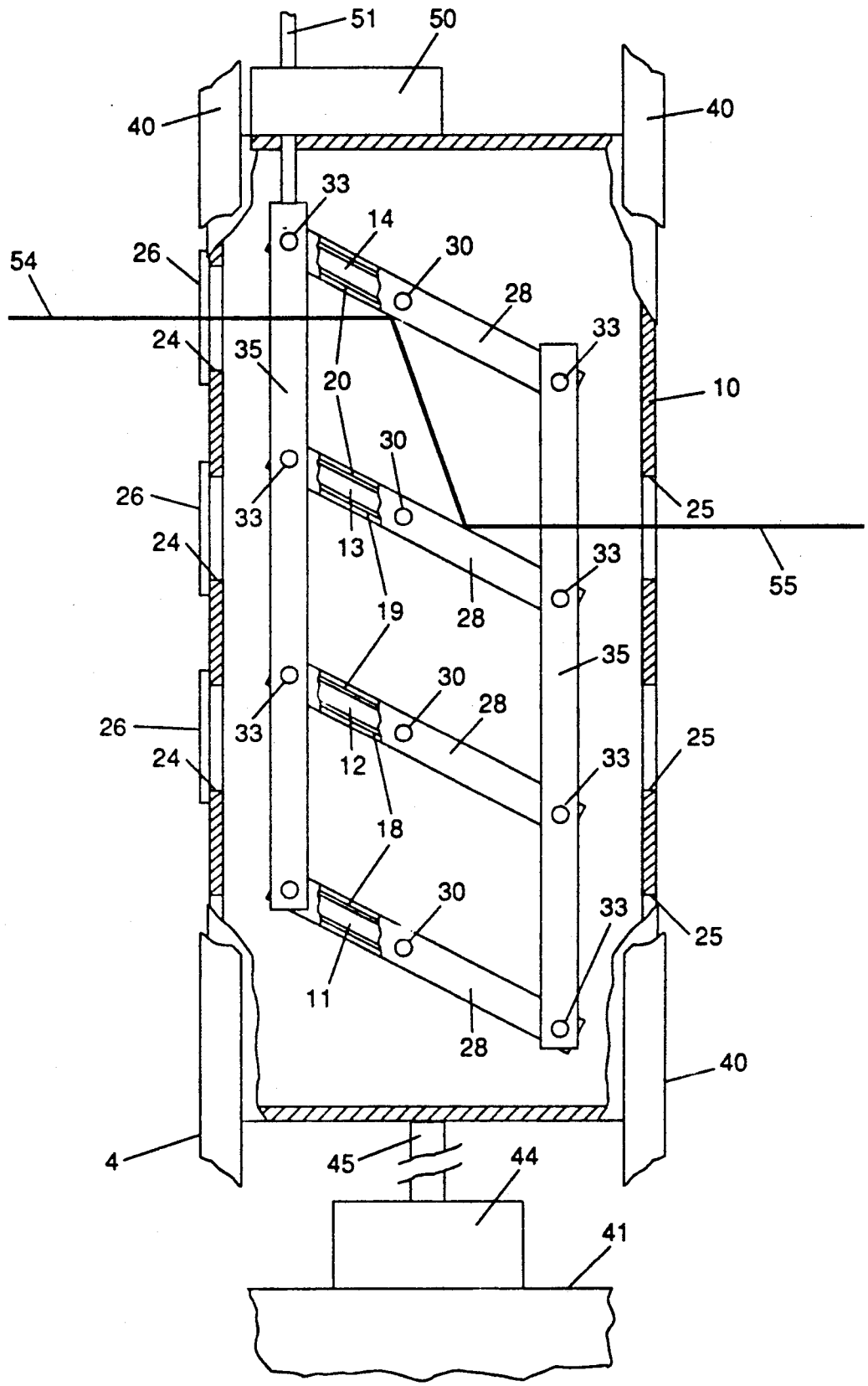
FIG. 1 is a side view of the apparatus of this invention with portions of the structure cut away to show the positioning of the pairs of mirrors in the housing and the multilayer coatings on the mirrors.

Referring now in detail to the drawing, there is shown a monochromator which includes a housing 10 having therein a plurality of mirrors 11, 12, 13 and 14 having opposed pairs of mirror faces 18, 19 and 20, with the housing being provided with inlet and outlet windows 24 and 25, respectively for each of the mirror pairs. Filters 26 mounted on the windows 24 reject visible and ultraviolet light.

The mirrors 11–14 are mounted in channels 28 which are provided with pivot pins 30 which extend through apertures (not shown) in the housing to allow the mirrors to pivot in the housing. The channels 28 are also provided with other pivot pins 33 which extend through apertures in a pair of links 35 which serve to hold the mirrors in a parallel relationship. The housing 11, the pivot pins 30 and 33 and the links 35 are precisely made to accurately hold the opposed mirror faces 18, 19 and 20 to within less than 1 arc second from absolute parallel.

Also, the opposite surfaces of each of the mirrors 11–14 are parallel to each other to within less than 1 arc second. All of the mirror surfaces should be superpolished to a smoothness of less than about 3 Angstroms RMS. When tested with visible light, the mirror surfaces should be flat to better than 1/20th wave. Materials which can be used for the mirrors and which can be polished to this degree are known.

Each pair of opposed or facing mirror faces 18, 19 and 20 is coated with a multilayer coating such that the pairs 18, 19 and 20 each have different coatings but the coatings on any given pair are identical. These coatings are made up of alternating layers of high-Z diffractor material of a thickness d1 separated by layers of low-Z spacer material of thickness d2. Such coatings and the methods of making them are known.

The multilayer coatings constitute synthetic Bragg crystals, with x-ray reflection taking place by Bragg diffraction. The wavelength at which the peak of the reflected flux occurs is given by the Bragg relation: $n(\lambda) = 2D\sin\theta$, where n is the order of the diffraction (usually taken to be unity), D is the multilayer diffractor and spacer thickness parameter and $\theta$ is the angle at which the radiation strikes the mirror surface.

One skilled in the art will be aware of which high Z materials will give the best diffraction performance at any desired wave length and which low Z spacer materials should be used with the selected high Z diffractor layers. He will also be aware of how to select the desired thicknesses d1 and d2 to obtain the desired diffractor and spacer thickness parameter.

Inasmuch as each pair of opposed mirror faces has its own multilayer coating, different from the coatings on the other pairs of faces, it can readily be seen that each pair of opposed faces will have a peak reflection of x-rays at some wavelength which is different from the peak reflection of the other pairs of faces. This allows one to select the pair of mirror faces which provides the greatest reflection of x-rays at the wavelength desired.

Figure 2:
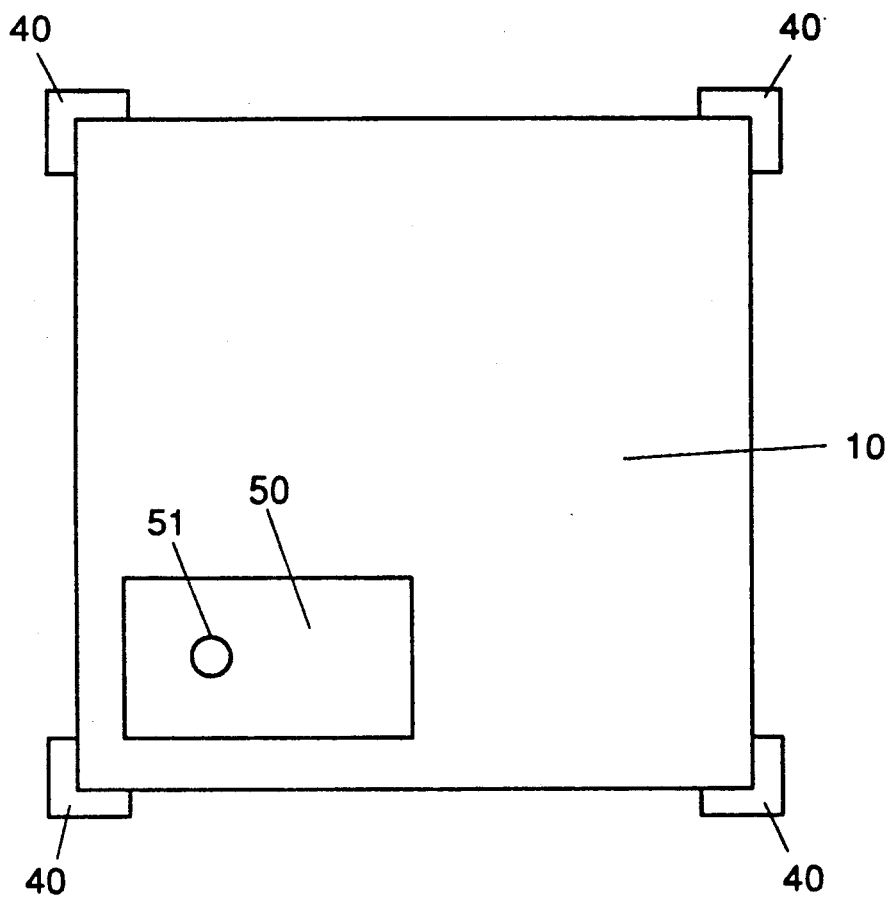
FIG. 2 is a plan view of the top of the apparatus showing the positioning of guides in which the housing moves.

The housing is mounted for sliding movement between a plurality of guides 40, as best shown in FIG. 2.

The guides 40 are mounted on a base 41 (FIG. 1) and are precisely made and positioned to very accurately position the housing as it is moved from one position to another in the guides 40. A driving mechanism of a known type 44 mounted on the base 41 is connected to the housing by a rod 45 for moving the housing 11 within the guides 40.

From the above, it will readily be apparent that the wavelength of peak reflectivity of x-rays by a multilayer mirror is dependent on the angle at which the x-ray beam strikes the mirror, so that one can vary the wavelength at which maximum reflectivity occurs by adjusting the angle of incidence. This is accomplished in this apparatus by pivoting the mirrors on the pivot pins 30.

A traversing mechanism 50 of a known type is mounted on the top of the housing and is adapted to traverse a rod 51 which is secured to one of the links 35 to pivot the mirrors to adjust the angle at which a polychromatic x-ray beam 54 strikes the mirror. It can be seen that upward movement of the rod 51 increases the angle of incidence, while downward movement of the rod 51 lowers the angle of incidence.

In operation, the driving mechanism 44 is actuated to move the housing 10 in the guides 40 to bring into the path of the polychromatic x-ray beam 54 that pair of mirror faces, 18, 19 or 20 which offer the best reflection over the desired wavelength range. The traversing mechanism 50 is then actuated to pivot the mirrors to change the angle of incidence to select the desired wavelength in the output beam 55. The polychromatic beam 54 reflects off the surface 20 of the mirror 14 (when the housing is positioned as shown in FIG. 1) to strike the surface 20 of the mirror 13 at the same angle of incidence. A monochromatic beam 55 is reflected out of the housing 10 through the outlet window 25 associated with the mirror pair 13 and 14.

What is claimed is:

1. An x-ray monochromator, comprising
   a. a base,
   b. a housing moveably mounted on the base and having in one side thereof an inlet window and in the other side thereof an outlet window,
   c. support means mounted in the housing,
   d. a plurality of pairs means, said mirrors defining a plurality of pairs of opposed mirror faces parallel to each other, each of said pair of opposing faces being coated with a multilayer coating, said multilayer coating on each pair of faces being different from the multilayer coatings on the other pairs of faces so that each pair of mirror faces has peak x-ray reflectivity at a different wavelength range,
   e. means on the base for moving the support means to bring one face of each pair of mirror faces into the path of a polychromatic beam of x-rays at one angle of incidence, said mirrors being so positioned that the x-ray beam is reflected to the other mirror face of said pair at the same angle of incidence and is reflected from said other mirror face out of the housing through said outlet window, and
   f. means on the housing and connected to the mirrors for pivoting the mirrors to change the angle at which the polychromatic beam of x-rays strikes the pair of mirror faces so that the multilayer coatings offer the greatest amount of reflection of the wavelength desired.

2. The apparatus of claim 1 wherein said inlet window is covered by a filter which rejects visible and ultraviolet light.

3. The apparatus of claim 2 wherein the housing is slidably mounted in a plurality of guides., attached to the base.

4. The apparatus of claim 3 wherein a traversing mechanism mounted on the housing and connected to the mirrors is provided for pivoting said mirrors.

5. The apparatus of claim 4 wherein the mirrors are polished to a smoothness within 3 Angstroms RMS.

* * * * *